(12) United States Patent
Kullander (10) Patent No.: US 11,346,322 B2
(45) Date of Patent: May 31, 2022

(54) WIND PARK

(71) Applicant: GOX AB, Hamburgsund (SE)

(72) Inventor: Thomas Kullander, Hamburgsund (SE)

(73) Assignee: GOX AB

( * ) Notice: Subject to any disclaimer, the term of this patent is extended or adjusted under 35 U.S.C. 154(b) by 55 days.

(21) Appl. No.: 16/766,501

(22) PCT Filed: Nov. 23, 2018

(86) PCT No.: PCT/EP2018/082328
§ 371 (c)(1),
(2) Date: May 22, 2020

(87) PCT Pub. No.: WO2019/101902
PCT Pub. Date: May 31, 2019

(65) Prior Publication Data
US 2020/0378362 A1    Dec. 3, 2020

(30) Foreign Application Priority Data
Nov. 24, 2017   (SE) .................................. 1751445-6

(51) Int. Cl.
*F03D 7/04*    (2006.01)
*F03D 7/06*    (2006.01)
(Continued)

(52) U.S. Cl.
CPC .............. *F03D 7/048* (2013.01); *F03D 7/02* (2013.01); *F03D 7/06* (2013.01); *F03D 9/257* (2017.02); *F05B 2240/96* (2013.01)

(58) Field of Classification Search
CPC ... F03D 7/048; F03D 7/02; F03D 7/06; F03D 9/257; F05B 2240/96
See application file for complete search history.

(56) References Cited

U.S. PATENT DOCUMENTS 7,337,726 B2 *   3/2008   Wobben ................. F03D 80/00
                                                104/112
7,750,491 B2 *   7/2010   Sankrithi ............... F03B 13/264
                                                290/54
(Continued)

FOREIGN PATENT DOCUMENTS

EP       1534951 A1    6/2005
EP       2487365 A1    8/2012
(Continued)

OTHER PUBLICATIONS

International Search Report with Written Opinion for Application No. PCT/EP2018/082328 dated Feb. 27, 2019, 11 pages.
(Continued)

*Primary Examiner* — Courtney D Heinle
*Assistant Examiner* — Ryan C Clark
(74) *Attorney, Agent, or Firm* — Lerner, David, Littenberg, Krumholz & Mentlik, LLP (57) ABSTRACT

The present disclosure relates to a wind park (10) comprising wind turbines arranged in a convex polygon comprising straight sides (3, 4, 5) connecting vertices of the polygon. A node wind turbine (1a, 1b, 1c) of a first type is located at each vertex of the polygon. One or more intermediate wind turbine (2a, 2b, 2c, 2d) of a second type is/are located along each side (3, 4, 5) of the polygon between two node wind (Continued)

turbines. The polygon forms an interior area (A) within the sides (3, 4, 5). The interior area (A) is free of turbines of the first and second type.

18 Claims, 9 Drawing Sheets

(51) Int. Cl.
  *F03D 9/25* (2016.01)
  *F03D 7/02* (2006.01)

(56) References Cited

U.S. PATENT DOCUMENTS

| | | | |
|---|---|---|---|
| 7,811,060 B2* | 10/2010 | Vanderhye | F03D 80/70 416/120 |
| 2006/0131889 A1* | 6/2006 | Corten | F03D 7/048 290/43 |
| 2006/0163880 A1* | 7/2006 | Wobben | F03D 80/00 290/44 |
| 2008/0067816 A1 | 3/2008 | Garzmann | |
| 2010/0215492 A1 | 8/2010 | Domenech Barcons | |
| 2011/0142619 A1 | 6/2011 | Subramanian et al. | |
| 2013/0101356 A1 | 4/2013 | Newcomer | |
| 2014/0017080 A1* | 1/2014 | Porm | F03D 1/0633 416/1 |
| 2014/0112777 A1* | 4/2014 | Kalra | F03D 7/048 416/1 |

FOREIGN PATENT DOCUMENTS

| | | |
|---|---|---|
| EP | 2670978 B1 | 7/2015 |
| EP | 2889472 A1 | 7/2015 |
| EP | 2910780 A1 | 8/2015 |
| JP | 2014013021 A | 1/2014 |
| WO | 2004011799 A1 | 2/2004 |
| WO | 2009003508 A1 | 1/2009 |
| WO | WO-2009003508 A1 * | 1/2009 ............ F03D 9/257 |
| WO | 2016040746 A1 | 3/2016 |

OTHER PUBLICATIONS

Swedish Search Report for Application No. 1751445-6 dated Jun. 15, 2015, 3 pages.

* cited by examiner

WIND PARK

CROSS-REFERENCE TO RELATED APPLICATIONS

The present application is a national phase entry under 35 U.S.C. § 371 of International Application No. PCT/EP2018/082328, filed Nov. 23, 2018, which claims priority from Swedish Patent Application No. 1751445-6, filed Nov. 24, 2017, the disclosures of which are hereby incorporated by reference in their entirety.

TECHNICAL FIELD

The present disclosure relates to a wind park comprising wind turbines arranged in a convex polygon comprising straight sides connecting vertices of the polygon. The present disclosure also relates to a control system for the wind park as well as a method for controlling wind turbines of the wind park.

BACKGROUND

Present-day wind parks often comprise a plurality of wind turbines which are all intended to be active in harvesting the wind energy. For instance, wind turbines may be arranged in rows and columns such that a grid of wind turbines is obtained.

Generally, an active wind turbine produces a wake of significantly turbulent flowing air downstream the turbine. It is often desired to avoid that such a wake imparts another wind turbine, located downstream of the wake producing wind turbine, since the power production of the downstream wind turbine may then be impaired. Moreover, the wake may result in undesired loads, such as fatigue loads, affecting the downstream wind turbine.

Thus, wind turbines are generally located and oriented relative to each other such that the influence of wakes is reduced or even omitted. However, such a location and orientation scheme generally result in an arrangement where the wind turbines are located at a large distance from each other. By steadily increased size of the wind turbines, the wind park will occupy an increasingly large area accompanied by a further reduced effect density. Such a large area is generally undesired since the area often cannot be used for any commercial purpose in addition to hosting the wind park. Moreover, the reduced effect density implies an ineffective use of the nowadays limited number of appropriate locations for enabling wind park establishment.

SUMMARY

In view of the above, an object of the present disclosure is to obtain a wind park having an appropriate power production at a relatively small area.

The above object may be achieved by the wind park of claim 1.

Thus, a first aspect of the present disclosure relates to a wind park comprising wind turbines arranged in a convex polygon comprising straight sides connecting vertices of the polygon, wherein a node wind turbine of a first type is located at each vertex of the polygon. One or more intermediate wind turbine of a second type is located along each side of the polygon between two node wind turbines. The polygon forms an interior area within the sides.

According to the first aspect of the present disclosure, the interior area is free of turbines of the first and second type.

As such, the interior area of the polygon of the wind park may be defined as to be free from the wind turbines which represent or make up the wind park. The surface of the polygon is bounded by its sides.

As used herein, the expression that a node wind turbine is located at each vertex of the polygon is intended to mean that a vertex of the polygon is located at a vertical projection of the rotor centre of each node wind turbine onto a surface in which the polygon extends.

As used herein, the expression that an intermediate wind turbine is located along a side of the polygon is intended to mean that at least a portion of a vertical projection of the intermediate wind turbine onto a surface in which the straight line connecting the vertices extends intersects such straight line. Optionally, the expression that an intermediate wind turbine is located along a side of the polygon may be intended to mean that the intermediate turbine is located such that a vertical projection of a centre of an intermediate wind turbine onto the above-mentioned surface is located relative to the straight line such that a smallest distance, as measured in the surface, to the intermediate line is within 40%, preferably within 25%, of the rotor diameter of the intermediate wind turbine. Purely by way of example, if the wind turbines forming the wind park are located on a horizontal plane, the above-mentioned surface is horizontally extending.

As used herein, the expression "wind turbine" relates to an assembly comprising at least a rotor and a supporting structure for the rotor. The supporting structure may comprise a tower and/or a foundation. Generally, a "wind turbine" used herein also comprises a generator and a shaft connecting the rotor to the generator.

A wind park as described hereinabove implies that a plurality of wind turbines in the polygon can be used for each possible wind direction. In particular, by virtue of the fact that the interior area is free of turbines of the first and second type, a reduced risk of downstream wind turbines in the polygon being exposed to wakes generated by upstream turbines is obtained. Moreover, the free interior area implies that turbines on opposing sides of the polygon may be active simultaneously, thus producing an appropriately large amount of power, whilst obtaining an appropriately low risk for wake interference.

The interior area may for instance be completely free from wind turbines, i.e. no wind turbines of any kind are present in the interior area in such a case.

A first type and second type as defined herein may be related to at least one of the location, direction and operation of the wind turbines in the arrangement. As used herein, two wind turbines may be regarded as being of the same type if the difference in rated power, viz the average amount of power that the wind turbine can generate per time unit, is such that the rated power of the wind turbine with the smallest rated power is at least 60%, preferably at least 80%, more preferred at least 90%, of the rated power of the wind turbine with the highest rated power. Purely by way of example, for two wind turbines having the same rated power, the rated power of one of the turbines is 100% of the other turbine.

Thus, two wind turbines may be deemed to be of the first type if the rated power of the wind turbine with the smallest rated power is at least 60%, preferably at least 80%, more preferred at least 90%, of the rated power of the wind turbine with the highest rated power. In a similar vein, two wind turbines may be deemed to be of the second type if the rated power of the wind turbine with the smallest rated power is at least 60%, preferably at least 80%, more preferred at least 90%, of the rated power of the wind turbine with the highest rated power.

There may be one intermediate turbine located along each side of the polygon. Optionally, there may be two or three intermediate turbines along each side of the polygon. Further optionally, though purely by way of example, there may be two intermediate turbines along one side of the polygon and three intermediate turbines along another side. The intermediate turbines need not necessarily be of the same type, e.g. the second type. Instead, it is contemplated that embodiments of the first aspect of the present disclosure may comprise intermediate turbines of a second type and at least also a third type. Purely by way of example, the third type may be different from each one of the first and second type.

A wind park may be instrumental in producing electrical effect and/or mechanical effect and/or hydraulic effect. Thus, the wind turbines may be connected by an electric cable to an electric grid for the purpose to deliver active and/or reactive electrical effect to that grid. Alternatively, the wind turbines may cause pumps and/or fans to rotate mechanically to create excessive pressure or vacuum without first transforming the harvested wind energy into electricity.

A wind park as described herein may be located at sea or on land. On land, the wind turbines of the polygon may be located at different height levels relative to, e.g. above and/or below, sea level.

Optionally, each one of the first and second type is a horizontal axis wind turbine. The horizontal axis wind turbine may have an axis of rotation at a small angle of inclination relative a horizontal line. Horizontal axis wind turbine may generally be associated with a relatively high rated power resulting in that a wind park comprising horizontal axis wind turbines may produce an adequate amount of power.

Optionally, each one of the first and second type is a vertical axis wind turbine. The vertical axis wind turbine may have an axis of rotation at a small angle of inclination relative a vertical line.

Optionally, each one of the first type is a horizontal axis wind turbine and each one of the second type is a vertical axis wind turbine or vice versa. Thus, the wind turbines of the wind park may be a mix of horizontal and vertical axis wind turbines.

Optionally, a wind turbine of the first type comprises a rotor with a rotor diameter, D, and a length range associated with the wind turbine of the first type is 6D-12D, preferably 7D-11,5D, more preferred 8D-10,5D, most preferred from 9D-10D, and the length of at least one side of the polygon is within the length range.

A length within any one of the above ranges implies a relatively low risk of wake interference between wind turbines associated with different sides of the polygon in spite of the fact that the wind park may be relatively compact.

Optionally, the polygon is a quadrilateral, for example having one of the following shapes: a square, a rectangle, a rhomb or a trapezium. A quadrilateral shape implies the possibility to configure a wind park which can produce a relatively high amount of power per area unit of the wind park.

Optionally, opposite sides of the quadrilateral are parallel. Parallel sides imply that the wind turbines may be controlled in an appropriate manner, e.g. in order to ensure that the wind turbines in the polygon are active approximately the same amount of time during the life span of the wind park.

Optionally, at least one node wind turbine comprises a meteorological measurement station being adapted to collect wind measurement intended to be communicated to a control system for the wind park.

The wind measurement collected from the meteorological instrument may be used for e.g. determining which wind turbines should be active and which should be inactive, for instance on the basis of a detected wind direction.

Optionally, the quadrilateral is arranged such that a diagonal connecting two opposing vertices of the quadrilateral is arranged to coincide with a primary wind direction associated with the location of the wind park. As used herein, the expression "primary wind direction" is intended to mean a compass direction with the highest percent of frequency of wind direction or combined wind direction and wind load.

The above orientation of the quadrilateral implies that all the wind turbines in the polygon may accumulate approximately the same usage time and wind load throughout the intended life span of the wind park. This result is achieved since the above orientation implies that wind will attack two sides of the quadrilateral at substantially the same amount of time.

Optionally, the intermediate wind turbines are evenly distributed along their respective sides of the polygon.

Optionally, the first type and the second type are of the same type. As such, the first type and second type may be of the same type in terms of rated power, i.e. within the rated power ranges discussed hereinabove.

Using the same wind turbine type for the first and second type implies a relatively simple and consistent design of the wind park, it also implies that a limited amount of spare parts needs to be stored for the wind part.

Optionally, a rotational direction of a wind turbine of the polygon is opposite to the rotational direction of each adjacent wind turbine of the polygon, as seen along the sides of the polygon.

The above-mentioned opposite rotation of adjacent wind turbines implies a reduced negative effect of wakes generated by upstream wind turbines.

Optionally, a wind park comprises wind turbines arranged in two or more polygons discussed hereinabove. Preferably, the polygons are arranged such that each polygon shares a common side and/or a common vertex with at least one other polygon.

As such, it is envisaged that wind parks may comprise a plurality of polygons. Such a wind park with a plurality of polygons implies a relatively compact wind park in which the activation/deactivation of turbines may be controlled in an appropriate manner.

Optionally, a rotational direction of a wind turbine of the wind park is opposite to the rotational direction of each adjacent wind turbine in the wind park, as seen along the sides of the polygons.

Optionally, at least one node wind turbine of the wind park of a polygon vertex connecting two polygon sides not in common with another polygon comprises the meteorological measurement station. Such a node wind turbine is located on the perimeter of the wind park. Thus, at least for certain wind directions, the wind towards the node wind turbine is generally not interfered by the other wind turbines in the wind park resulting in that the meteorological measurement station may provide reliable measurement data.

A second aspect of the present disclosure relates to a control system for a wind park according to the first aspect of the present disclosure.

The control system is adapted to:
  obtain meteorological data and/or information comprising at least a current wind direction,
  use wind turbine state data and/or information for each wind turbine in the wind park, the wind turbine state data and/or information comprising at least wind turbine position information,
  on the basis of the meteorological data and/or information and the wind turbine state data and/or information, control activation and deactivation of the wind turbines of the wind park.

The above control of the activation/deactivation of the wind turbines implies that an appropriately large amount of power may be produced whilst at the same time having a low risk for undesired effects occasioned by wind wakes.

Optionally, a quadrilateral is associated with four sectors, each sector being defined by diagonals connecting two opposing vertices of the quadrilateral such that each sector comprises a side of the quadrilateral. The control system is adapted to:
  determine within which sector the current wind direction is located, on the basis of the determined sector, control the intermediate wind turbines such that the intermediate wind turbines of the side in the determined sector as well as its opposing side are active and such that the intermediate wind turbines of the other two sides are inactive.

The above control implies that the intermediate wind turbines are activated/deactivated such that each intermediate wind turbine is active approximately half the time throughout the lifespan of the wind park, assuming the wind park is operating in omnidirectional wind.

This implies that the life span of each intermediate wind turbine may be twice as large as the life span of a corresponding wind turbine which is always active.

An active wind turbine is intended to mean a wind turbine in an operational state, preferably producing power. On the other hand, a deactivated or inactive wind turbine is intended to mean a wind turbine in a state not producing power and/or for which the rotor is stationary. Thus, a power production status of a wind turbine, e.g. a power output, and/or a rotational status of a rotor a wind turbine, e.g. a rotor speed, during wind conditions that enable power to be produced and/or rotation of the rotor, may be utilized to determine the operational status, i.e. if the wind turbine is active or inactive. Purely by way of example, a wind turbine may be deemed to be in an inactive or deactivated state if the rotational speed of its rotor is less than 10% of a maximum rotational speed of the rotor, preferably less than 5% of a maximum rotational speed of the rotor, more preferably less than 2% of a maximum rotational speed of the rotor, most preferably less than 1% of a maximum rotational speed of the rotor.

Optionally, the control system is adapted to control the node wind turbines such that each node wind turbine is active approximately half the time and inactive approximately half the time of the life span of the wind park.

As for the intermediate wind turbine, the above control of the node wind turbines also implies a large useful life span of the node wind turbines. In particular, the above control of the node wind turbines implies that the life span of the node wind turbines corresponds to the life span of the intermediate wind turbines.

A third aspect of the present disclosure relates to a method for controlling wind turbines of a wind park according to the first aspect of the present disclosure.

The method comprises:
  obtaining meteorological data and/or information comprising at least a current wind direction,
  using wind turbine state data and/or information for each wind turbine in the wind park, the wind turbine state data and/or information comprising at least wind turbine position information,
  on the basis of the meteorological data and/or information and the wind turbine state data and/or information, controlling activation and deactivation of the wind turbines of the wind park.

Optionally, a quadrilateral is associated with four sectors, each sector being defined by diagonals connecting two opposing vertices of the quadrilateral such that each sector comprises a side of the quadrilateral. The method comprises:
  determining within which sector—the current wind direction is located,
  on the basis of the determined sector, controlling activation and deactivation of the intermediate wind turbines such that the intermediate wind turbines of the side in the determined sector as well as its opposing side are active and such that the intermediate wind turbines of the other two sides are inactive.

Optionally, the method further comprises: controlling the node wind turbines such that each node wind turbine is active approximately half the time and inactive approximately half the time of the life span of the wind park.

BRIEF DESCRIPTION OF THE DRAWINGS

The present disclosure will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The present disclosure will, in the following, be exemplified by embodiments. It should however be realized that the embodiments are included in order to explain principles of the present disclosure and not to limit the scope of the present disclosure. Details from two or more of the embodiments may be combined with each other.

Figure 1A:
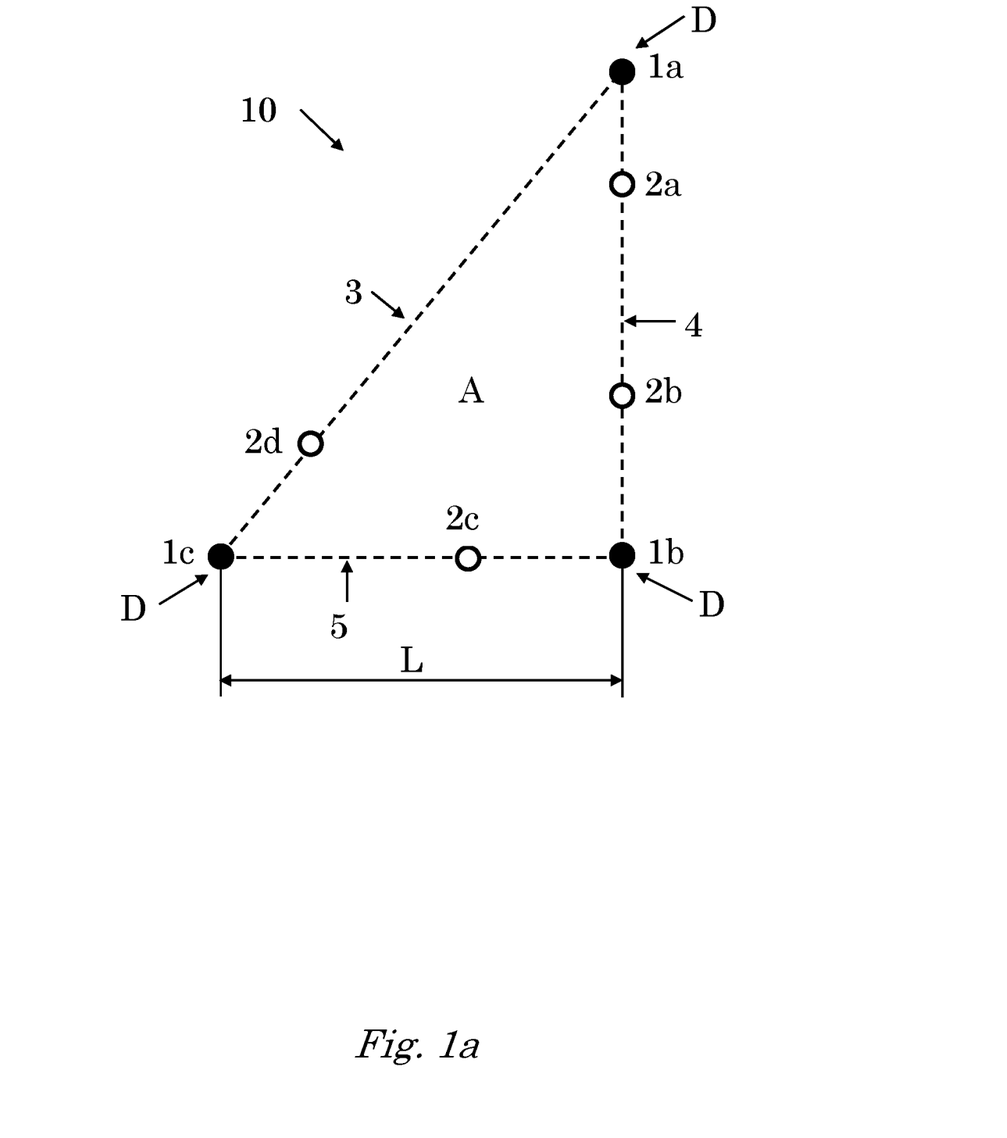
FIG. 1a illustrates an embodiment of the present disclosure.

An example of the present disclosure will be presented herein below with reference to FIG. 1a. FIG. 1a schematically illustrates a wind park 10 comprising wind turbines 1a-c, 2a-d arranged in a convex polygon comprising straight sides 3, 4, 5 connecting vertices of the polygon. A node turbine 1a-c of a first type is located at each vertex of the polygon. One or more intermediate turbine(s) 2a-d of a second type is/are located along each side of the polygon between two node wind turbines 1a-c. The polygon forms an interior area A within the sides 3, 4, 5. The interior area A is free of wind turbines of the first and second type. As such, the interior area A of the polygon of the wind park 10 is defined as to be free from the wind turbines which represent or make up the wind park.

In FIG. 1a, the polygon has three vertices, thus having the shape of a triangle. However, the polygon may have any number of vertices, for example 4 or 6, thereby forming a quadrilateral or hexagon respectively. Further, the polygon in FIG. 1a is depicted with one intermediate wind turbine along two of the three sides and two intermediate wind turbines along the third side. Hence, the number of intermediate turbines along each side may differ. In theory, there is no upper limit for the number of wind turbines comprised in a wind park. For the sake of simplicity and practicality, embodiments of the present disclosure described herein comprise a reasonable number of wind turbines deemed necessary for presenting features of the present disclosure. On a larger, commercial scale, however, a wind park may comprise much larger numbers of wind turbines.

Figure 1B:
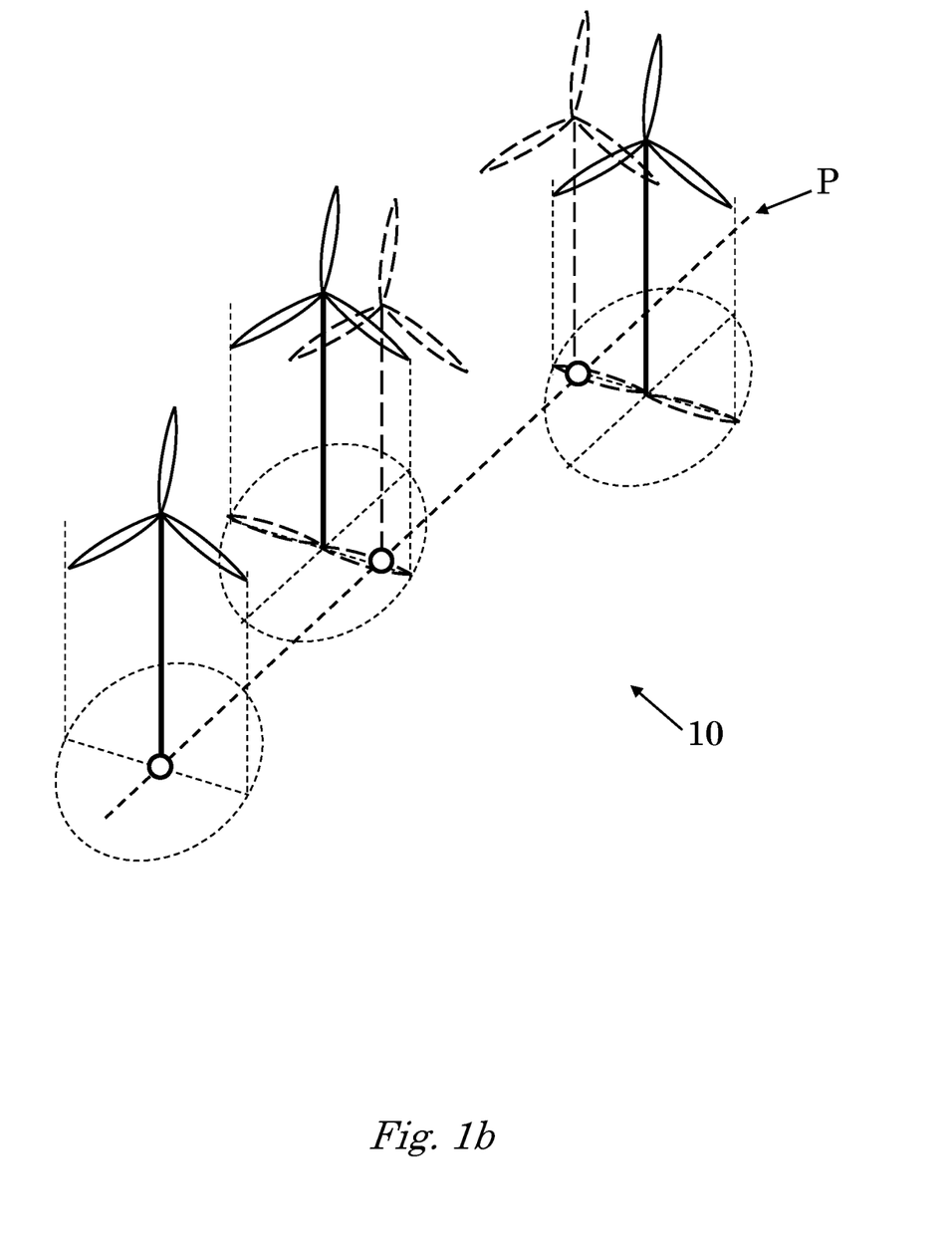
FIG. 1b illustrates a vertical projection of the wind turbines onto a surface.

The straight sides 3, 4, 5 connecting the vertices of the polygon are indicated in FIG. 1a by dashed lines, and as described herein, the intermediate wind turbines 2a-d are depicted as located along these sides 3, 4, 5. As used herein, the expression that an intermediate wind turbine is located along a side of the polygon is intended to mean that at least a portion of a vertical projection of the intermediate wind turbine onto a surface in which the straight line connecting the vertices extends, intersects such straight line, see FIG. 1b. In FIG. 1b a perspective view of three intermediate wind turbines located along a side of a polygon is illustrated. At least a portion of a vertical projection of each intermediate wind turbine, as indicated by dashed lines, onto a surface in which the straight line P connecting the vertices extends, intersects the straight line P.

Purely by way of example, the interior area A is completely free from wind turbines, i.e. no wind turbines of any kind are present in the interior area A in such a case.

A wind park 10 as described herein is located at sea or on land. On land, the wind turbines of the polygon may be located at different height levels relative to, e.g. above and/or below, sea level. In this case, arranging the wind turbines in a convex polygon may be achieved by arranging the wind turbines such that a vertical projection of the wind turbines onto a horizontal or flat surface forms the shape of a convex polygon.

Alternatively, the wind turbines may be arranged in a convex polygon by arranging the wind turbines such that a vertex of the polygon is located at the rotor centre of each node wind turbine, thus forming the polygon. As such, the polygon need not necessarily have a planar extension but may extend in one or several planes and/or in a curved surface.

For a wind park located at sea each wind turbine may be directly connected to the sea floor and/or each wind turbine may be moored to a certain location. Here, it is envisaged that embodiments of the wind park may comprise a joint mooring system for the wind park or an individual mooring system for each wind turbine.

Optionally, the wind turbines of the first and second type are horizontal axis wind turbines.

Optionally, the wind turbines of the first and second type are vertical axis wind turbines.

Optionally, the wind turbines of the first type are horizontal wind turbines and each one of the second type are vertical axis wind turbines, or vice versa.

Optionally, the first type and the second type are of the same type.

By way of example, a wind turbine 1a-c of the first type has a rotor with a rotor diameter D. A length range associated with the wind turbine of the first type may then be 6D-12D, preferably 7D-11,5D, more preferred 8D-10,5D, most preferred from 9D-10D, and the length L of at least one side of the polygon is within the length range, see FIG. 1a.

Figure 2A:
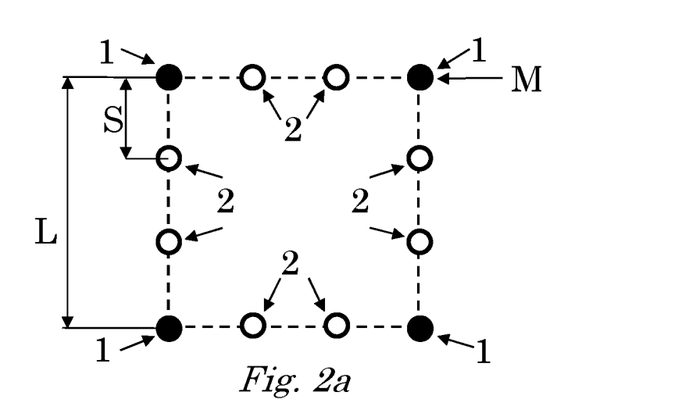
FIGS. 2a, 2b, 2c illustrates embodiments of the present disclosure.
Figure 2B:
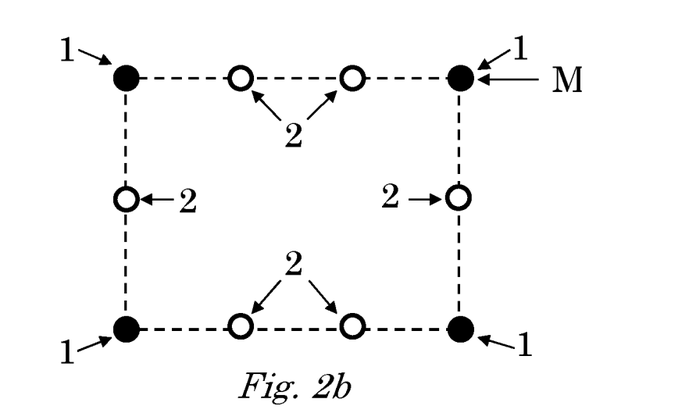
Figure 2C:
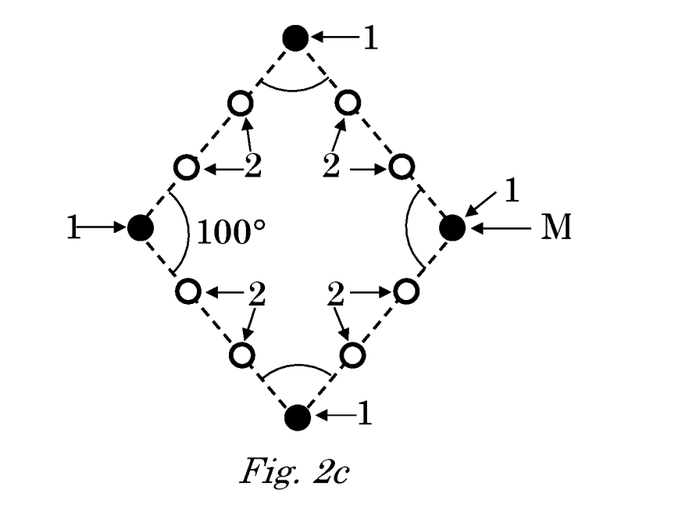

In FIGS. 2a-2c further embodiments of the present disclosure are schematically illustrated. The wind turbines 1, 2 in FIGS. 2a to 2c are arranged in a quadrilateral. In FIG. 2a the wind turbines 1, 2 of the wind park 10 are arranged in a square. Consequently, the sides have a similar length and opposite sides of the square are parallel. In the following, node wind turbines 1 are indicated by black-filled circles and intermediate wind turbines 2 are indicated by white-filled circles. Two intermediate turbines 2 are depicted along each side, and they are evenly distributed along their respective side. Hence, if the length L of a side of the square is, for example, 9-10D, the distance S between two adjacent wind turbines along a side is approximately 3-3,3D. As will be described below, a quadrilateral in the shape of square comprising two intermediate wind turbines along each side is a preferred embodiment.

In FIG. 2b, the wind turbines 1, 2 are arranged in a rectangle. Along each short side a single intermediate wind turbine 2 is depicted, while two intermediate wind turbines 2 are depicted along each of the two remaining opposite sides. As for the arrangement in FIG. 2a the intermediate wind turbines 2 are evenly distributed along their respective side. In FIG. 2c the wind turbines are arranged in a rhomb. By way of example, the corner angles of the rhomb are 90°±10°. Hence, the angles of two opposing corners are approximately 100°, and the other two are approximately 80°. Two intermediate turbines 2 are depicted along each side and they are evenly distributed along their respective side, as described for the embodiments of FIGS. 2a and 2b. Other shapes of quadrilaterals, in addition to the ones exemplified in FIGS. 2a to 2c are also plausible, for example a trapezium which does not have parallel sides. It is also envisaged that embodiments of the wind park may comprise unevenly distributed intermediate wind turbines.

The arrangement of wind turbines of a wind park as described herein is intended for omnidirectional wind. However, commonly a wind park for omnidirectional wind is intended for location in an area which experiences one or more primary wind directions, i.e. the wind direction when studied over time falls within a single predominant wind sector or several predominant wind sectors. For example, a wind park intended for the North Sea will typically experience primary wind directions from the south-west and west.

Figure 3:
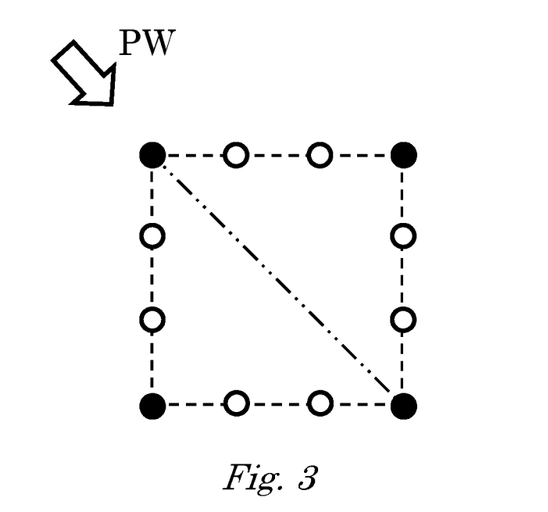
FIG. 3 illustrates an embodiment of the present disclosure.

Optionally, and preferably, for an embodiment of the present disclosure comprising a quadrilateral arrangement of the wind turbines, the quadrilateral is arranged such that a diagonal connecting two opposing vertices of the quadrilateral is arranged to coincide with a primary wind direction PW associated with the location of the wind park, see FIG. 3. The primary wind direction PW is indicated by the white-filled arrow and the diagonal is indicated by the dotted and dashed line. In this embodiment the wind turbines are arranged in a square, however other shapes of quadrilaterals are equally plausible.

For each one of the embodiments presented herein, at least one node turbine 1 of an embodiment as described herein may comprise a meteorological measurement station M, see e.g. FIGS. 2a to 2c. The station is adapted to collect wind measurement intended to be communicated to a control system for the wind park. By way of example, for a quadrilateral arrangement of the wind turbines of the wind park, two or three node turbines comprise a meteorological measurement station. Thereby, wind measurements of undisturbed, free wind may be achieved for all wind directions, i.e. not affected by e.g. turbulence from adjacent wind turbines.

Figure 4:
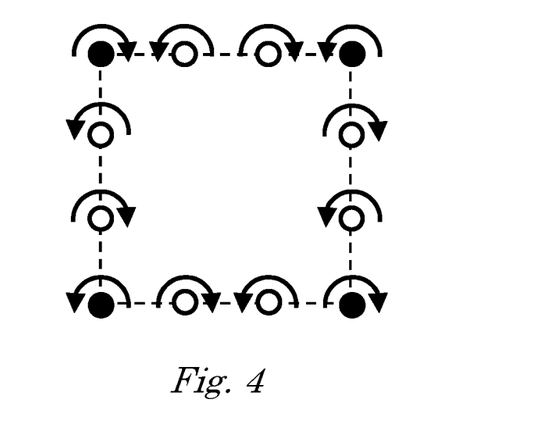
FIG. 4 illustrates an embodiment of the present disclosure.

With reference to FIG. 4, an embodiment as described herein is depicted wherein a rotational direction of a wind turbine of the polygon is opposite to the rotational direction of each adjacent wind turbine of the polygon, as seen along the sides of the polygon. The rotational direction of each wind turbine is indicated by a black-filled curved arrow respectively. The wind turbines are arranged in a square in FIG. 4, however any other shape of the polygon and/or number of intermediate wind turbines is equally plausible.

Figure 5:
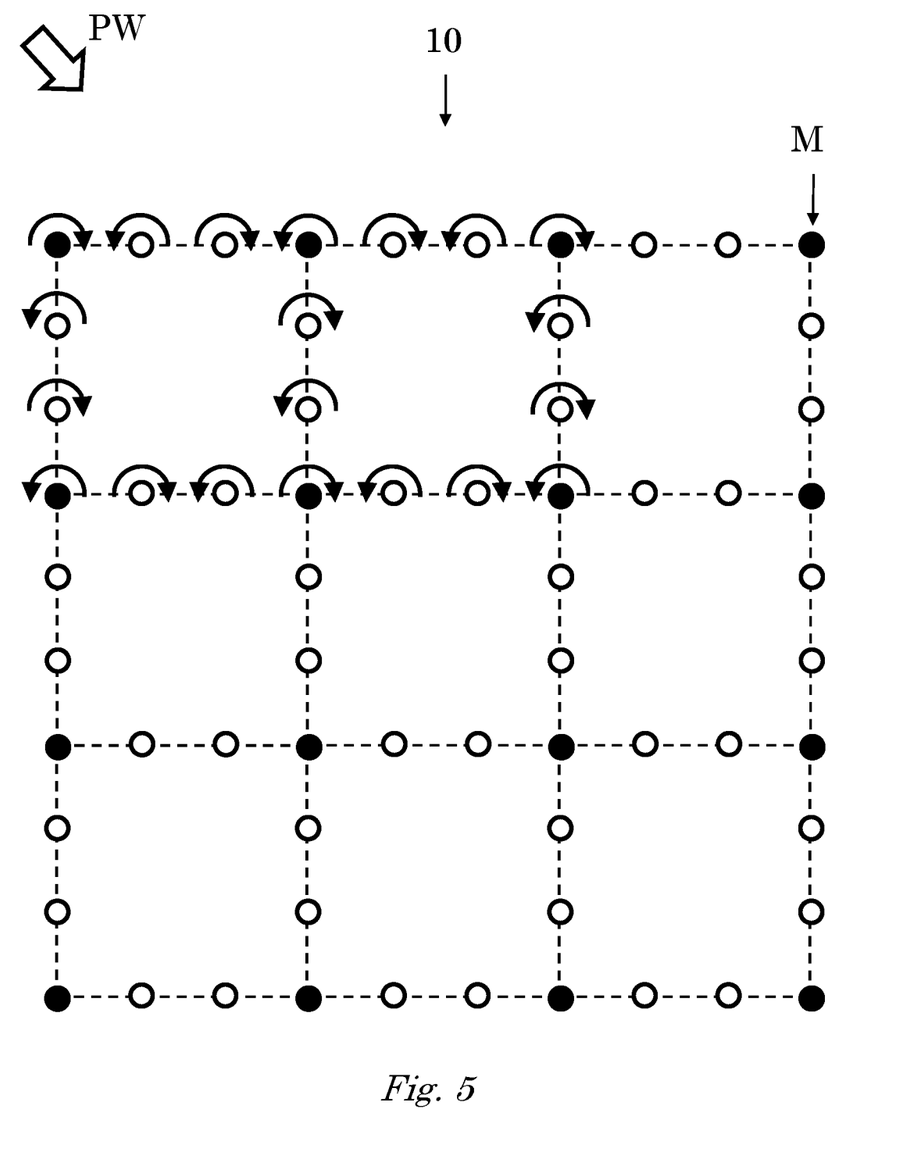
FIG. 5 illustrates an embodiment of the present disclosure.

Optionally, a wind park 10 according to the present disclosure comprises wind turbines arranged in two or more polygons as described herein. Preferably the polygons are arranged such that each polygon shares a common side and/or a common vertex with at least one other polygon, see FIG. 5. In FIG. 5, a wind park 10 is schematically illustrated comprising wind turbines arranged in three by three squares. Again, node wind turbines are indicated by black-filled circles to distinguish them from the intermediate wind turbines. In this case, the squares are arranged so as to form rows and columns, sharing sides and vertices with adjacent squares. As an alternative, or as a complement, wind turbines arranged in different shapes of convex polygons may be comprised in the wind park. Purely by way of example, a wind park may comprise wind turbines arranged in a quadrilateral and a triangle, sharing a common node wind turbine.

For a wind park as described herein, at least one node wind turbine of a polygon vertex connecting to polygon sides not in common with another polygon may comprise a meteorological measurement station M, see FIG. 5, wherein the top right node wind turbine, i.e. a peripheral corner node turbine of the wind park 10 is indicated as comprising the station M.

As illustrated for the wind park 10 in FIG. 5, a rotational direction of a wind turbine of a polygon may be opposite to the rotational direction of each adjacent wind turbine of the polygon, as seen along the sides of the polygon. The rotational direction of the wind turbines is indicated by the black-filled curved arrows in a similar manner as has been used in FIG. 4. In FIG. 5, the rotational direction of wind turbines for two quadrilaterals are indicated to illustrate the principle. Consequently, all wind turbines of the wind park 10 may be given a rotational direction following the same principle.

Thus, as described above, a wind park is preferably arranged such that a diagonal connecting two opposing vertices of the wind park, wherein the two opposing vertices respectively connects to polygon sides not in common with another polygon, is arranged to coincide with a primary wind direction PW associated with the location of the wind park 10.

Figure 6:
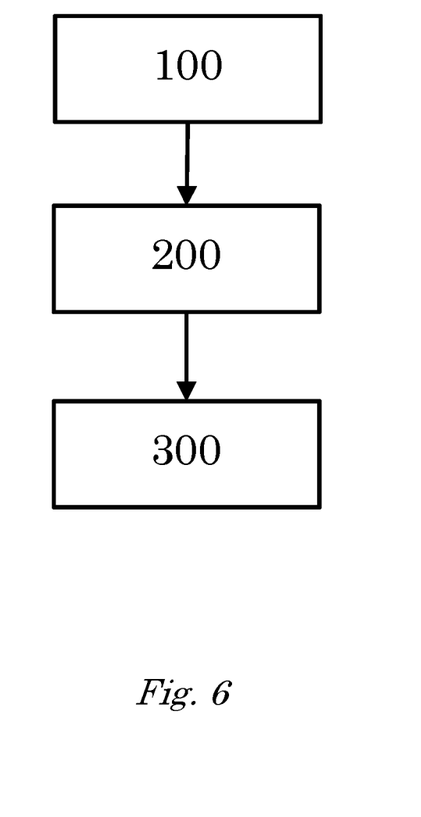
FIG. 6 illustrates a third aspect of the present disclosure.

With reference to FIG. 6, a method for controlling wind turbines of a wind park according to the present disclosure is described. The method comprises:
    obtaining (100) meteorological data and/or information comprising at least a current wind direction,
    using (200) wind turbine state data and/or information for each wind turbine in the wind park, the wind turbine state data and/or information comprising at least wind turbine position information,
    on the basis of the meteorological data and/or information and the wind turbine state data and/or information, controlling (300) activation and deactivation of the wind turbines of the wind park.

Optionally, the meteorological data is obtained from a measurement station located in a node turbine of the wind park as described above.

Figure 7A:
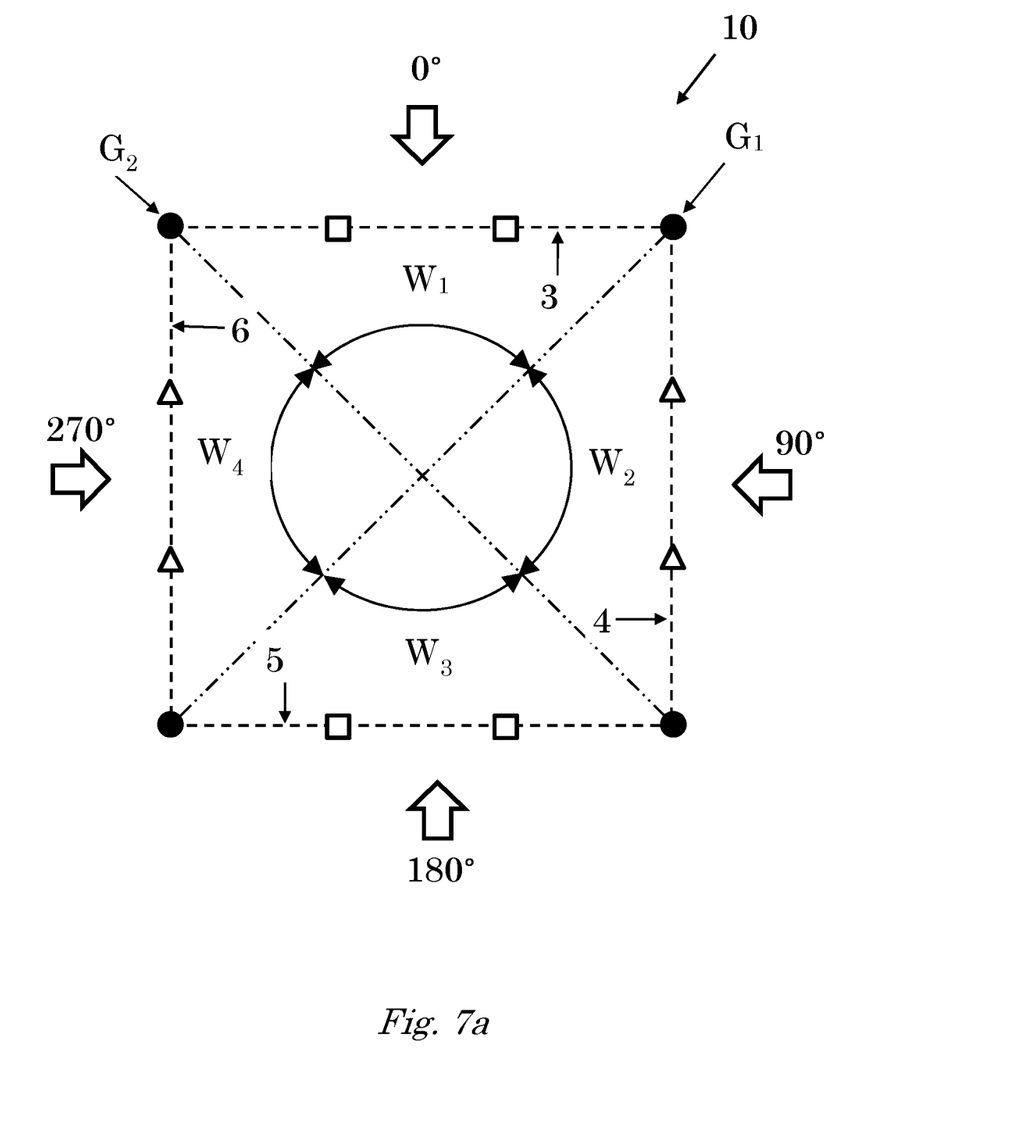
FIGS. 7a and 7b illustrate embodiments of the present disclosure.
Figure 7B:
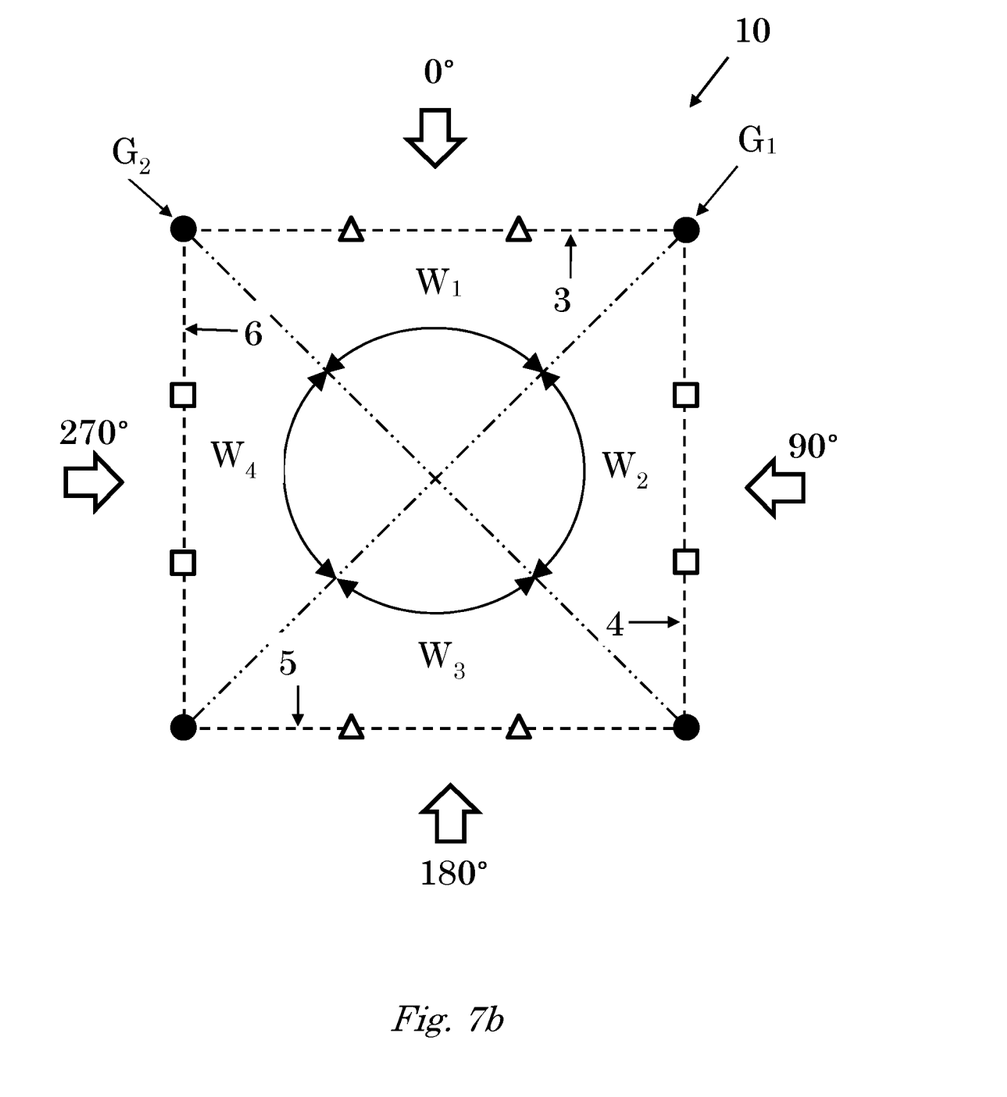

In embodiments herein, a quadrilateral is associated with four sectors $W_1, W_2, W_3, W_4$ each sector $W_1, W_2, W_3, W_4$ being defined by diagonals $G_1, G_2$ connecting two opposing vertices of the quadrilateral such that each sector $W_1, W_2, W_3, W_4$ comprises a side 3, 4, 5, 6 of the quadrilateral, see e.g., FIG. 7. In this case, the method comprises:
    determining within which sector $W_1, W_2, W_3, W_4$ the current wind direction is located,
    on the basis of the determined sector $W_1, W_2, W_3, W_4$ controlling activation and deactivation of the intermediate wind turbines such that the intermediate wind turbines of the side 3, 4, 5, 6 in the determined sector $W_1, W_2, W_3, W_4$ as well as its opposing side 3, 4, 5, 6 are active and such that the intermediate wind turbines of the other two sides are inactive.

An example of the method as described herein will be presented below with reference to FIGS. 7a and 7b. A wind park 10 comprising wind turbines arranged in a quadrilateral is illustrated in FIGS. 7a and 7b. Two intermediate turbines are located along each side 3, 4, 5, 6 of a quadrilateral. Thus, the wind turbines of the quadrilateral may be seen so as to be arranged in two rows and two columns. Purely by way of example, a rotational direction of a wind turbine may be same for all the wind turbines or opposite for each adjacent wind turbine arranged in the two rows or columns. The intermediate wind turbines are depicted by white-filled shaped figures and node wind turbines by black-filled shaped figures.

The quadrilateral in FIGS. 7a and 7b is associated with four sector $W_1, W_2, W_3, W_4$ as described above. A wind direction for each sector is indicated by a white-filled arrow. With reference to FIG. 7a, for a wind direction within the top sector, set to a 0° wind direction for reference, intermediate wind turbines along the side 3 in the sector $W_1$ in which the wind direction is located as well as the opposing side 5 of the quadrilateral are active. The active intermediate wind turbines are indicated by square-shaped figures, while the inactive intermediate wind turbines are indicated by triangle-shaped figures. Thus, the active intermediate wind turbines are located along the (two) rows of the arrangement of wind turbines.

If the wind direction was to change, e.g. to 180°, the active intermediate turbines would be the same as when the wind direction is within the top sector. In the same way, a continued transition of the wind direction to the sector with the white-filled arrow indicating a wind direction set to 270°, the active intermediate turbines would be the same as for a wind direction in the sector indicated with a wind direction set to 90°, see FIG. 7b. In FIG. 7b the active intermediate turbines are located in sectors $W_2$, $W_4$ indicated by squares, and thus, located along the (two) columns of the arrangement of wind turbines.

Consequently, the activation of the intermediate wind turbines of an arrangement of wind turbines as described herein is dependent on the wind direction. Further, with reference to FIGS. 7a and 7b, each intermediate wind turbine may be active in mainly bi-directional wind, the intermediate wind turbines along the (two) rows of the arrangement may be active in mainly bi-directional wind perpendicular to the mainly bi-directional wind for which the intermediate wind turbines along the (two) columns are active. Thus, as implied by the reasoning above, only half of the intermediate turbines are active at a time, and which half that is active alternates depending on the wind direction. Thus, a wind park as described herein may be regarded as condensed in a way meaning that there is a surplus of intermediate wind turbines since not all are being active at the same time. In this way, an increased life span of the wind park may be achieved. The intermediate wind turbines take turn at being active and thus may double the overall life span of the wind park.

As a complement, a method as described herein may further comprise controlling the node wind turbines such that each node wind turbine is active approximately half the time and inactive approximately half the time of the life span of the wind park.

Figure 8:
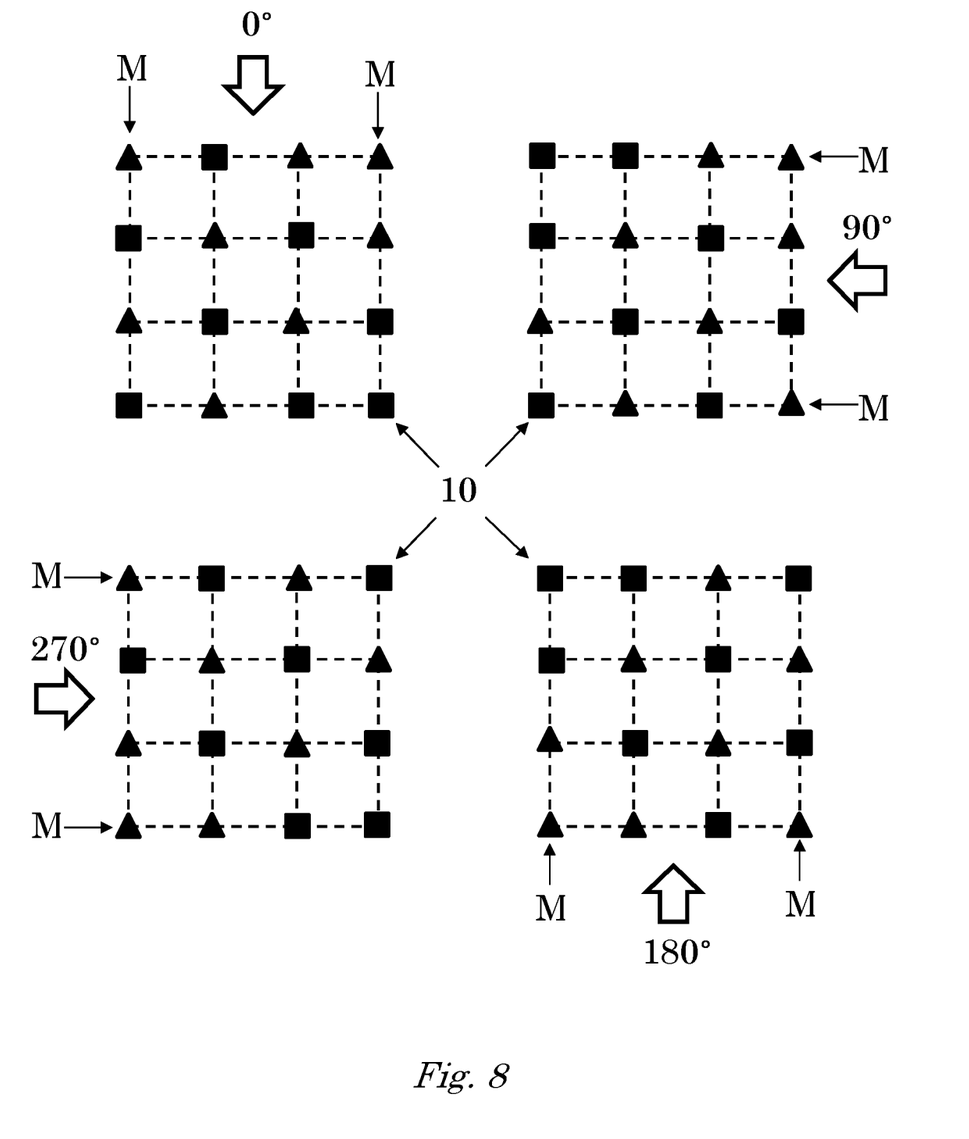
FIG. 8 illustrates an embodiment of the present disclosure.

The activation and deactivation of the node wind turbines may be different from what has been exemplified in FIGS. 7a and 7b for the intermediate turbines. However, preferably, the node turbines are activated and deactivated such that each node wind turbine is active approximately half the time and inactive approximately half the time of the life span of the wind park. This may be achieved by switching active node turbines on and off depending on the wind direction, as for the intermediate wind turbines, in which case also each node wind turbine may be active in mainly bi-directional wind, or by switching according to a pre-determined schedule. Thereby a similar life span for all wind turbines of the wind park may be achieved. FIG. 8 illustrates an example of how the switching of active node wind turbines may be performed during one of two complimentary periods of time as per a pre-determined schedule.

In FIG. 8, a wind park 10 is schematically illustrated comprising wind turbines arranged in three by three squares. Again, node wind turbines are indicated by black-filled shape figures, while intermediate wind turbines are not shown. The active node wind turbines are indicated by square-shaped figures, while the inactive node wind turbines are indicated by triangle-shaped figures. FIG. 8 illustrates the result from activation and deactivation of a total of 16 node wind turbines for the principal wind directions of 0, 90, 180 and 270 degrees, i.e. covering the complete 360 degrees turn of the wind direction. At each instance thereof, 8 node wind turbines are active and 8 node wind turbines are inactive. FIG. 8 indicates two meteorological stations M always located to the windward side of the wind park and thus available for measuring and reporting wind data to the wind park. Moreover, only two node wind turbines are switched on/off at each shift of the intermediate wind turbines, thereby only 8 shifts of node wind turbines are necessary per each complete 360 degrees turn.

The method according to the present disclosure is performed by a system, e.g. a control system as described herein.

A control system for a wind park according to the present disclosure is adapted to:
  obtain meteorological data and/or information comprising at least a current wind direction,
  use wind turbine state data and/or information for each wind turbine in the wind park, the wind turbine state data and/or information comprising at least wind turbine position information,
  on the basis of the meteorological data and/or information and the wind turbine state data and/or information, control activation and deactivation of the wind turbines of the wind park or wind park.

If a quadrilateral is associated with four sectors $W_1, W_2, W_3, W_4$, in a manner described above, the system is adapted to:
  determine within which sector $W_1, W_2, W_3, W_4$ the current wind direction is located,
  on the basis of the determined sector $W_1, W_2, W_3, W_4$, control activation and deactivation of the intermediate wind turbines such that the intermediate wind turbines of the side 3, 4, 5, 6 in the determined sector $W_1, W_2, W_3, W_4$ as well as its opposing side 3, 4, 5, 6 are active and such that the intermediate wind turbines of the other two sides 3, 4, 5, 6 are inactive.

As a complement, and preferably, a control system as described herein is adapted to control the node wind turbines such that each node wind turbine is active approximately half the time and inactive approximately half the time of the life span of the wind park.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A wind park comprising:
  wind turbines arranged in a convex polygon comprising straight sides connecting vertices of said polygon, wherein a node wind turbine of a first type is located at each vertex of said polygon, one or more intermediate wind turbine of a second type being located along each side of said polygon between two node wind turbines, said polygon forming an interior area within said sides, wherein said interior area is free of turbines of said first and second type and said polygon is a quadrilateral associated with four sectors, each sector being defined by diagonals connecting two opposing vertices of said quadrilateral such that each sector comprises a side of said quadrilateral; and
  a control system for the wind park, the control system being adapted to:
    obtain one or both of meteorological data and information comprising at least a current wind direction,
    use one or both of wind turbine state data and information for each wind turbine in said wind park, said wind turbine state data and information comprising at least wind turbine position information,
    on the basis of said one or both of meteorological data and information and said one or both of wind turbine state data and information, control activation and deactivation of said wind turbines of said wind park determine within which sector said current wind direction is located, and
    on the basis of the determined sector, control said intermediate wind turbines such that said intermediate wind turbines of said side in the determined sector as well as its opposing side are active and such that the intermediate wind turbines of the other two sides are inactive.

2. The wind park according to claim 1, wherein each one of said first and second type is a horizontal axis wind turbine.

3. The wind park according to claim 1, wherein each one of said first and second type is a vertical axis wind turbine.

4. The wind park according to claim 1, wherein each one of said first type is a horizontal axis wind turbine and each one of said second type is a vertical axis wind turbine or vice versa.

5. The wind park according to claim 1, wherein a wind turbine of said first type comprises a rotor with a rotor diameter (D) and a length range associated with said wind turbine of said first type is 6D-12D, and a length of at least one side of said polygon is within said length range.

6. The wind park according to claim 1, wherein said polygon is a quadrilateral.

7. The wind park according to claim 6, wherein opposite sides of said quadrilateral are parallel.

8. The wind park according to claim 1, wherein at least one node wind turbine comprises a meteorological measurement station being adapted to collect wind measurement.

9. The wind park according to claim 6, wherein said quadrilateral is arranged such that a diagonal connecting two opposing vertices of said quadrilateral is arranged to coincide with a primary wind direction associated with the location of said wind park.

10. The wind park according to claim 1, wherein said intermediate wind turbines are evenly distributed along their respective sides of said polygon.

11. The wind park according to claim 1, wherein said first type and said second type are of the same type.

12. The wind park according to claim 1, wherein a rotational direction of a wind turbine of said polygon is opposite to the rotational direction of each adjacent wind turbine of said polygon, as seen along said sides of said polygon.

13. The wind park according to claim 1 comprising wind turbines arranged in two or more polygons, said polygons being arranged such that each polygon shares one or both of a common side and a common vertex with at least one other polygon.

14. The wind park according to claim 13, wherein a rotational direction of a wind turbine of said wind park is opposite to the rotational direction of each adjacent wind turbine in said wind park, as seen along said sides of said polygons.

15. The wind park according to claim 13, wherein at least one node wind turbine of said wind park of a polygon vertex connecting two polygon sides not in common with another polygon comprises a meteorological measurement station.

16. The control system according to claim 1, wherein said control system is adapted to control said node wind turbines such that each node wind turbine is active approximately half the time and inactive approximately half the time of the life span of the wind park.

17. A method for controlling wind turbines of a wind park comprising wind turbines arranged in a convex polygon comprising straight sides connecting vertices of said polygon, wherein a node wind turbine of a first type is located at each vertex of said polygon, one or more intermediate wind turbine of a second type being located along each side of said polygon between two node wind turbines, said polygon forming an interior area within said sides, wherein said interior area is free of turbines of said first and second type and said polygon is a quadrilateral associated with four sectors, each sector being defined by diagonals connecting two opposing vertices of said quadrilateral such that each sector comprises a side of said quadrilateral, said method comprising:
- obtaining one or both of meteorological data and information comprising at least a current wind direction,
- using one or both of wind turbine state data and information for each wind turbine in said polygon, said wind turbine state data and information comprising at least wind turbine position information,
- on the basis of said one or both of meteorological data and information, said one or both of wind turbine state data and information, and a determination of within which sector said current wind direction is located, controlling activation and deactivation of said wind turbines of said wind park such that said intermediate wind turbines of said side in the determined sector as well as its opposing side are active and such that the intermediate wind turbines of the other two sides are inactive.

18. The method according to claim 17, wherein said method further comprises: controlling said node wind turbines such that each node wind turbine is active approximately half the time and inactive approximately half the time of the life span of the wind park.

* * * * *